US009946545B2

(12) United States Patent
Hardage et al.

(10) Patent No.: US 9,946,545 B2
(45) Date of Patent: Apr. 17, 2018

(54) BUFFER STORE WITH A MAIN STORE AND AND AUXILIARY STORE

(75) Inventors: James Nolan Hardage, Austin, TX (US); Glen Andrew Harris, Austin, TX (US); Mark Carpenter Glass, Dripping Springs, TX (US)

(73) Assignee: ARM Limited, Cambridge (GB)

( * ) Notice: Subject to any disclaimer, the term of this patent is extended or adjusted under 35 U.S.C. 154(b) by 1149 days.

(21) Appl. No.: 12/926,415

(22) Filed: Nov. 16, 2010

(65) Prior Publication Data

US 2012/0124301 A1    May 17, 2012

(51) Int. Cl.
G06F 15/00    (2006.01)
G06F 9/00     (2006.01)
G06F 9/44     (2006.01)
G06F 9/38     (2018.01)
G06F 5/06     (2006.01)

(52) U.S. Cl.
CPC ............ *G06F 9/3806* (2013.01); *G06F 5/065* (2013.01); *G06F 9/381* (2013.01)

(58) Field of Classification Search
None
See application file for complete search history.

(56) References Cited

U.S. PATENT DOCUMENTS

| | | | |
|---|---|---|---|
| 6,453,278 B1 * | 9/2002 | Favor et al. | 703/27 |
| 6,957,327 B1 * | 10/2005 | Gelman | G06F 9/3844 712/237 |
| 2004/0186985 A1 * | 9/2004 | Tran et al. | 712/239 |
| 2005/0071602 A1 * | 3/2005 | Niell | G06F 9/30098 712/202 |
| 2007/0113058 A1 * | 5/2007 | Tran | G06F 9/30036 712/241 |
| 2010/0269102 A1 * | 10/2010 | Latorre | G06F 9/3842 717/130 |

OTHER PUBLICATIONS

Jayapala et al., "Clustered Loop Buffer Organization for Low Energy VLIW Embedded Processors", *IEEE Computer Society*, vol. 54, No. 6, Jun. 2005, pp. 672-683.
Lee et al., "Instruction Fetch Energy Reduction Using Loop Caches for Embedded Applications with Small Tight Loops", No Date, pp. 267-269.

* cited by examiner

*Primary Examiner* — George Giroux
(74) *Attorney, Agent, or Firm* — Nixon & Vanderhye P.C.

(57) ABSTRACT

A loop buffer is provided with a main store 26 and an auxiliary store 28. The main store 26 stores micro-operation instructions. The auxiliary store 28 has fewer entries than the main store 26 and stores target addresses for predicted taken branch instructions stored within the main store 26. Read control circuitry serves to control reading from the main store and from an auxiliary store such that target addresses are read from the auxiliary store in association with the predicted taken branch instructions read from the main store.

15 Claims, 5 Drawing Sheets

| Predicted Taken Branches in Main Store | Branch Taken Addresses Auxiliary Store | Control Queue Pointers | Auxiliary Sequence |
|---|---|---|---|
| BrA | TA<br>x<br>x | 0<br>0<br>0<br>0 | TA, TA, TA,<br>TA, TA,...<br>(length 4 shift queue) |
| BrA<br>BrB | TA<br>TB<br>x | 0<br>1<br>0<br>1 | TA, TB, TA,<br>TB, TA,...<br>(length 4 shift queue) |
| BrA<br>BrB<br>BrC | TA<br>TB<br>TC | 0<br>1<br>2<br>1 | TA, TB, TC,<br>TA, TB,...<br>(don't care due to shift queue loop of three entries) |

FIG. 3

BUFFER STORE WITH A MAIN STORE AND AND AUXILIARY STORE

BACKGROUND OF THE INVENTION

Field of the Invention

This invention relates to the filed of data processing systems. More particularly, this invention relates to buffer stores for use within data processing systems.

Description of the Prior Art

It is known to provide data processing systems with buffer stores. For example, a buffer store may be used as a loop buffer within a data processing system to store a sequence of program instructions or micro-operations corresponding to a previously encountered program loop. Such a loop buffer can be used to supply the program instructions or micro-operations to a processor instead of fetching these repeatedly from a memory. This can increase processing speed and reduce power consumption.

Within such a loop buffer, the program instructions or the micro-operations will be stored together with additional data needed for the proper handling of those program instructions or micro-operations. One example of such additional data is the storage of branch target addresses for predicted taken branches stored within a loop buffer. Such predicted taken branches are required for resolution of those predicted taken branch instructions. It is possible to provide storage for a branch target address for every stored program instruction or micro-operation within the loop buffer. This significantly increases the overhead in terms of circuit area, cost and power of the loop buffer.

SUMMARY OF THE INVENTION

Viewed from one aspect the present invention provides a buffer store comprising:

main store circuitry configured to store N main values to be read in a predetermined main sequence;

auxiliary store circuitry configured to store M auxiliary values, M being less than N and each auxiliary value of said M auxiliary values being associated with a main value of said N main values; and read control circuitry configured to control reading from said main store and from said auxiliary store such that said auxiliary value is read from said auxiliary store in association with said main value.

The present technique recognises that within a buffer store having a main store and an auxiliary store it is possible to provide read control circuitry which associates auxiliary values read from the auxiliary store with main values read from the main store in a predetermined main sequence such that even though the auxiliary store has the ability to store fewer auxiliary values than main values that may be stored within the main store, the auxiliary values are still correlated with the main values with which they correspond.

Whilst not restricted to use as a loop buffer, in the case of this use, the auxiliary store may provide storage for only relatively few branch target addresses as it is recognised that in reality relatively few of the program instructions or micro-operations stored in the main store will be predicted taken branches. As a loop buffer is in any case targeting statistically likely usage scenarios, e.g. loops of a form suitable for storage in the loop buffer, tuning the loop buffer to more closely match the likely storage requirements of loops that are in reality encountered makes a more efficient use of circuit resources.

In some embodiments the main store may be read a single main value at a time. However, in other embodiments it is possible that a plurality of main values may be read together from the main store.

Correlation of auxiliary values to main values may be assisted when the read control circuitry is configured to detect from the main value read from the main store that the main value is associated with an auxiliary value and to trigger that auxiliary value to be read from the auxiliary store. As an example, if the main value read from the main store is identified as a predicted taken branch program instruction or micro-operation, then the read control circuitry can trigger reading of a branch target address from the auxiliary store.

The correlation between the reading of the main values from the main store in accordance with the predetermined main sequence and the reading of the auxiliary values from the auxiliary store is facilitated when the auxiliary values within the auxiliary store are read in a predetermined auxiliary sequence matched to the predetermined main sequence. This reduces the overhead necessary to establish the correlation between main values and auxiliary values.

The read control circuitry may comprise a shifting control queue storing pointers indicating storage locations within the auxiliary store with these pointers being ordered within the shifting control queue to match the predetermined auxiliary sequence and being shifted within the shift control queue upon one or more reads of auxiliary values to present the next read position within the predetermined auxiliary sequence. Such a shifting control queue provides a relatively rapid and low overhead mechanism for establishing and maintaining the correlation between main value reads and auxiliary value reads.

It will be appreciated that the ratio of main values to auxiliary values can vary depending upon the particular use of the buffer store. However, in the case of a loop buffer store it has been found that the number of main values stored within the main store may be greater than ten times the number of auxiliary values stored within the auxiliary store and yet still support an overwhelming majority of real life program loops and their need to store target addresses for predicted taken branch program instructions or micro-operations.

Viewed from another aspect the present invention provides a buffer store comprising:

main store means for storing N main values to be read in a predetermined main sequence;

auxiliary store means for storing M auxiliary values, M being less than N and each auxiliary value of said M auxiliary values being associated with a main value of said N main values; and read control circuitry means for controlling reading from said main store means and from said auxiliary store means such that said auxiliary value is read from said auxiliary store in association with said main value.

Viewed from a further aspect the present invention provides a method of buffering comprising the steps of:

storing within a main store N main values to be read in a predetermined main sequence;

storing within an auxiliary store M auxiliary values, M being less than N and each auxiliary value of said M auxiliary values being associated with a main value of said N main values; and controlling reading from said main store and from said auxiliary store such that said auxiliary value is read from said auxiliary store in association with said main value.

The above, and other objects, features and advantages of this invention will be apparent from the following detailed description of illustrative embodiments which is to be read in connection with the accompanying drawings.

BRIEF DESCRIPTION OF THE DRAWINGS

FIG. 3 schematically illustrates data stored within and control of the auxiliary store for different numbers of predicted taken branches stored within the main store;

DESCRIPTION OF THE EMBODIMENTS

Figure 1:
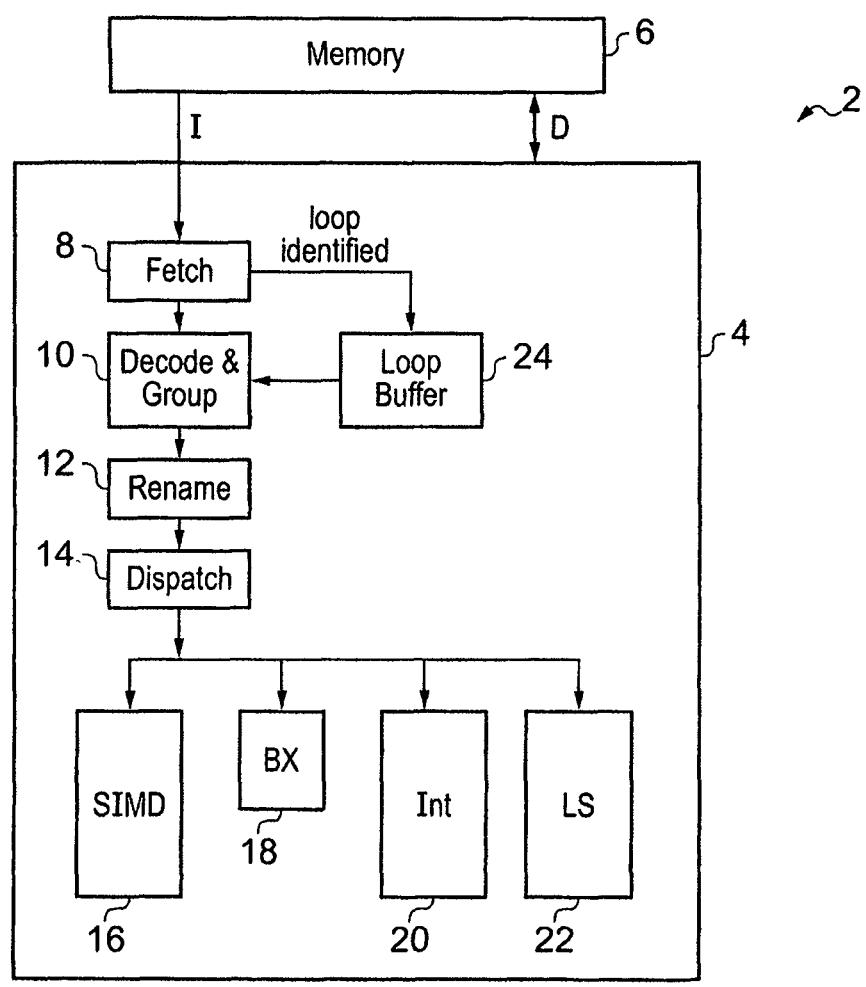
FIG. 1 schematically illustrates a processor including a loop buffer.

FIG. 1 illustrates a data processing system 2 including a processor 4 coupled to a memory 6. The memory 6 stores program instructions to be executed and data values to be manipulated. The program instructions are fetched from the memory 6 by a fetch unit 8 and passed between a decode and grouping unit 10, a renaming unit 12 and a dispatch unit 14 down to a selected one of a plurality of processing pipelines including a single instruction multiple data (SIMD) pipeline 16, a branch resolution pipeline 18, an integer pipeline 20 and a load/store pipeline 22. A loop buffer 24 is associated with the decode and grouping unit 10. The loop buffer 24 stores a sequence of micro-operations identified by the fetch unit 8 as corresponding to a loop of program instructions that has been encountered more than a predetermined number of times. This loop of program instructions must meet certain requirements in order to be capable of storage within the loop buffer 24. As an example, the number of micro-operations corresponding to the program loop must not exceed the storage capacity of the loop buffer 24 and the number of predicted taken branch instructions within the loop must not exceed the storage capacity of the loop buffer 24 to store target branch addresses.

It will be appreciated by those in the technical field that the processor 4 will typically include many further circuit elements but that these have been omitted from FIG. 1 for the sake of clarity.

Figure 2:
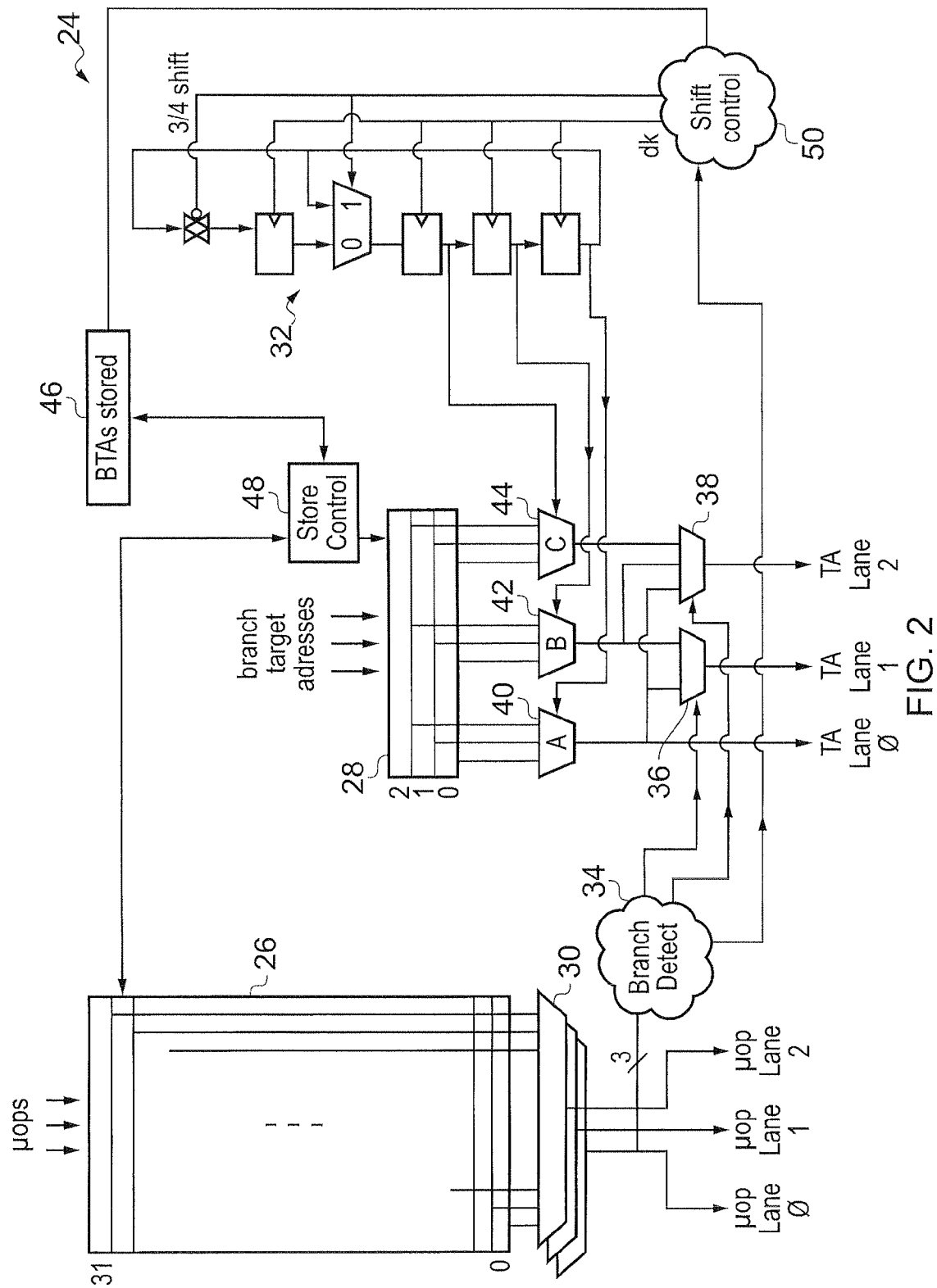
FIG. 2 schematically illustrates a loop buffer having a main store and an auxiliary store.

FIG. 2 schematically illustrates the loop buffer 24 in more detail. The loop buffer 24 includes a main store 26 and an auxiliary store 28. The main store 26 contains thirty two entries, and is capable of storing up to thirty two micro-operations. The auxiliary store 28 contains three entries and is capable of storing up to three branch target addresses. Multiplexers 30 associated with the main store 26 serves to read out three micro-operations at a time from the main store 26 for supply into the processing pipeline of the processor 4.

The auxiliary store 28 has three entries each capable of storing a branch target address. These branch target addresses need to be correlated to predicted taken branch micro-operations stored within the main store 26. The remainder of the circuitry illustrated in FIG. 2 can together be considered to provide the read control circuitry for controlling the reading of the main values and the auxiliary values from the main store 26 and the auxiliary store 28.

Branch detection circuitry 34 serves to detect if any of the micro-operations being read from the three micro-operation lanes at the output of the main store 26 are predicted taken branch instructions. The branch detection circuitry 34 generates control signals for multiplexers 36 and 38 which serve to select to supply an appropriate correlated branch target address read from the auxiliary store 28 onto the target address output of a lane in which a predicted taken branch instruction has been detected as being output from the main store 26. Multiplexers 40, 42 and 44 serve to select respective different entries within the auxiliary store 28 for supply into the target address lanes. Shifting control queue circuitry 34, comprising four serially connected registers each storing a pointer to one of the entries within the auxiliary store 28, serves to generate outputs for controlling the multiplexers 40, 42, 44 in accordance with the contents of the last three register stages of the shifting control queue circuitry 32. The pointers in these register stages have values programmed and shifted so as to correlate to the sequence in which the branch target addresses should be read out from the auxiliary store 28 to match the order in which predicted taken branches are encountered when traversing the predetermined main sequence through the micro-operations stored within the main store 26. The shifting control queue circuitry 32 is shifted as the predicted taken branch micro-operations are encountered and their target addresses output such that the predetermined sequence in which the auxiliary values are read out from the auxiliary store 28 matches the predetermined main sequence in which the predicted taken branch micro-operations are read out from the main store 26.

A branch target address register 46 stores a value indicative of the total number of branch target addresses stored within the auxiliary store 28. Store control circuitry 48 serves to control the main store 26 and the auxiliary store 28 to capture the micro-operation instructions and the branch target addresses for a loop which has been identified as will be described further below.

Shift control circuitry 50 associated with the shifting control queue circuitry 32 serves to generate a signal controlling whether or not values are shifted through all four of the register locations of the shifting control queue circuitry 32 or only through the lower three register locations. The shift control circuitry 50 further serves to generate a number of clock pulses (each causing a one stage shift in position) in dependence upon the number of predicted taken branches output on the three read lanes of the main store 26 during any parallel read operation.

FIG. 3 schematically illustrates the contents of the auxiliary store 28 the control queue pointers stored within the shifting control queue circuitry 32 and the predetermined auxiliary sequence in which the target addresses are accessed for various numbers of predicted taken branches stored within the main store 26. When the main store 26 includes a single branch, then the branch target address for this single branch is stored in locations 0 of the auxiliary store 28. The contents of the control queue pointers are all set to "0". The shift length associated with the shifting control queue circuitry is set to four and given that all of the pointers point to storage location "0" within the auxiliary store 28, the sequence of target address is read will be TA, TA, TA, etc.

In the case of the main store 26 containing two predicted taken branch micro-operations, then storage locations "0" and "2" within the auxiliary store 28 will store the target address for the first of these predicted taken branch instructions and the storage location "1" within the auxiliary store 28 will store the target address for the second of these predicted taken branch instructions. The control queue pointers will be set to "0101" starting from the lower end of the shifting control queue circuitry 32. The shift length for the shifting control queue circuitry is set to four. As a consequence, the predetermined auxiliary sequence of target addresses read from the auxiliary store will be TA, TB, TA, TB, TA, etc., which matches the alternating sequence with which the two predetermined taken branch micro-operations are encountered when the program loop stored within the main store 26 is replayed.

In the case that the main store 26 stores three predicted taken branch micro-operations, these have corresponding target addresses that are stored within respective entries of the auxiliary store 28. The control queue pointers are set to a sequence "0, 1, 2, (don't care)" and the shift length of the shifting control queue circuitry is set to three. This will control the predetermined auxiliary sequence to be TA, TB, TC, TA, TB, TC, TA, etc. The target addresses will be read out in the same order as the predicted taken branch instructions are encountered within the micro-operations read from the main store 26.

The number of predicted taken branch instructions read from the main store 26 at any given time (cycle) controls by how many positions the shifting control queue circuitry is advanced through this repeating sequence of control queue pointers. The control queue pointer for multiplexer 40 will be set to a value corresponding to the next target address to be used. The following target address will be pointed to by the pointer controlling the multiplexer 42 and the third target address to be used in sequence will be pointed to by the pointer controlling the multiplexer 44. The multiplexers 40, 42 and 44 thus present at their outputs the next three target addresses to be used in the correct order starting from the output of the multiplexer 40. The multiplexers 36 and 38 select the branch target addresses output from the multiplexers 40, 42, 44 to be applied to the target address lanes in which the predicted taken branch micro-operations are output from the main store 26.

Figure 4:
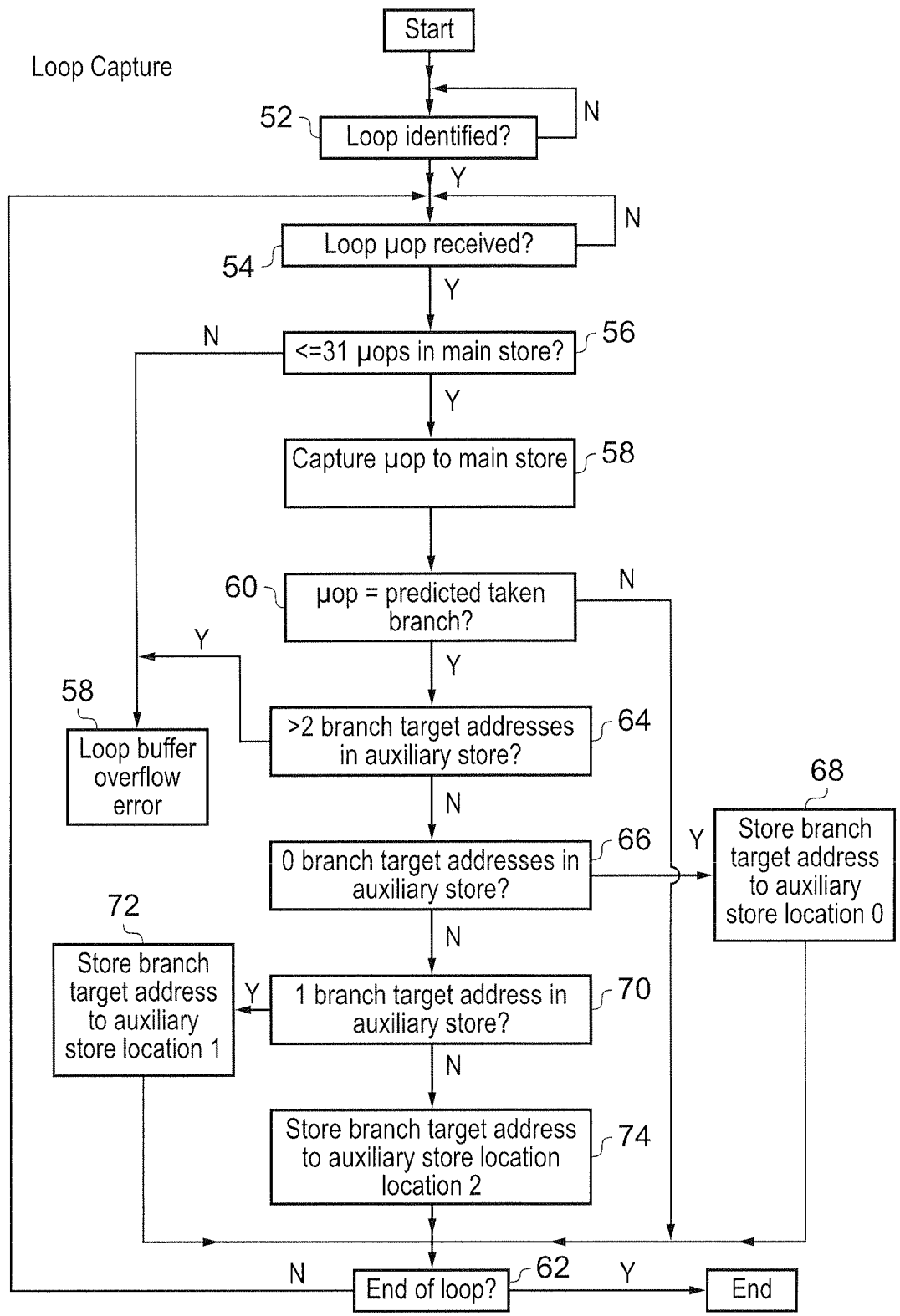
FIG. 4 is a flow diagram schematically illustrating loop capture into the loop buffer.

FIG. 4 is a flow diagram schematically illustrating the operation of loop capture into the loop buffer 24. At step 52 processing waits until a loop is identified. Step 54 waits until a micro-operation for the loop is received. Step 56 determines whether more than 31 micro-operations are already stored within the main store 26. If there are more than 31 micro-operations already stored within the main store 26, then there is insufficient capacity to store the next micro-operation of the loop identified and accordingly processing proceeds to step 58 where a loop overflow buffer error is triggered. This may, for example, take the form of abandoning the attempt to store the program loop into the loop buffer 24.

If the determination at step 56 is that there is still capacity within the main store 26, then step 58 captures the micro-operation instruction into the main store 26. Step 60 determines whether the captured micro-operation instruction is a predicted taken branch instruction. If the captured micro-operation instruction is not a predicted taken branch instruction, then processing proceeds to step 62. Step 62 determines whether or not the end of the loop identified has been reached. If the end of the loop has been reached, then the loop capture operation terminates. If the end of the loop has not been reached, then processing returns to step 54.

If the determination at step 60 is that the captured micro-operation instruction is a predicted taken branch instruction, then step 64 determines whether there are two branch target addresses already stored within the auxiliary store 28. If there are more than two branch target addresses already stored within the auxiliary store 28, then there is insufficient capacity to store the branch target address associated with the captured micro-operation instruction and a loop buffer overflow error is again triggered at step 58. If there is capacity to store the branch target address within the auxiliary store 28, then processing proceeds to step 66. If there are no branch target addresses currently stored within the auxiliary store 28, then step 66 directs processing to step 68 where the branch target address is stored into the auxiliary store at location 0. Step 68 determines whether there is a single branch target address currently stored within the auxiliary store 28. If there is a single branch target address currently stored within the auxiliary store 28, then step 72 stores the newly captured branch target address to the auxiliary store location 1.

If steps 66 and 70 did not identify either zero or one branch target addresses already stored within the auxiliary store 28, then there must be two branch target addresses already stored within the auxiliary store 28, and accordingly, step 74 serves to store the newly captured branch target address to auxiliary store location 2. The operation of FIG. 4 serves to populate the branch target addresses into the auxiliary store 28 in the pattern illustrated in FIG. 3.

Figure 5:
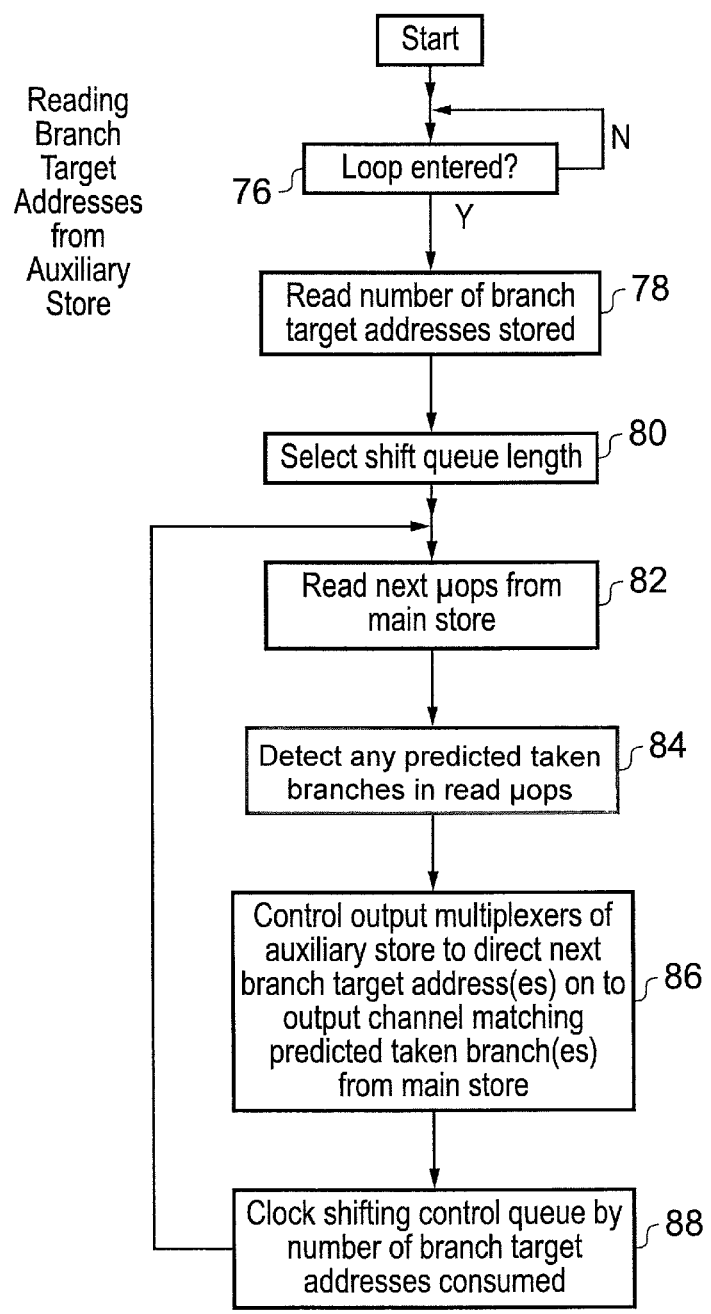
FIG. 5 is a flow diagram schematically illustrating the control of the reading of branch target addresses from the auxiliary store in association with prediction taken branches read from the main store.

FIG. 5 is a flow diagram schematically illustrating the reading of branch target addresses from the auxiliary store. Step 76 determines when a loop has been entered and is being read from the main store 26. At step 78 the number of branch target addresses stored within the auxiliary store 28 is read from the branch target address register 46. Step 80 then selects the shift length to be applied by the shift control circuitry 50 in dependence upon the number of branch target addresses stored within the auxiliary store 28.

Step 82 reads the next three micro-operation instructions from the main store 26. At step 84 the branch detection circuitry 34 detects how many predicted taken branches are currently being read from the main store 26. Step 86 controls the output multiplexers 40, 42, 44, 36, 38 of the auxiliary store 28 to direct the next branch target address(es) onto the output channel matching the predicted taken branch(es) being read from the main store. At step 88 the shifting control circuitry 50 shifts the shifting control queue 32 by a number of clock signals corresponding to the number of branch target addresses consumed. Processing then returns to step 82.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A buffer store comprising:
main store circuitry configured to store N main values to be read in a predetermined main sequence;
auxiliary store circuitry configured to store M auxiliary values, M being less than N and each auxiliary value of said M auxiliary values being associated with a main value of said N main values; and
read control circuitry configured to control reading from said main store and from said auxiliary store such that said auxiliary value is read from said auxiliary store in association with said main value, wherein
said read control circuitry is configured to control reading of auxiliary values from said auxiliary store circuitry in a predetermined auxiliary sequence matched to said predetermined main sequence such that each of said M auxiliary values is read from said auxiliary store circuitry together with an association one of said N main values read from said main store circuitry; and said read control circuitry comprises shifting control queue circuitry storing pointers indexing storage locations within said auxiliary store circuitry, said pointers having a relative ordering amongst each other within said shifting control queue circuitry that matches said predetermined auxiliary sequence and said relative ordering within said shifting control queue circuitry being changed upon a read of one or more auxiliary values from said auxiliary store circuitry to represent a next read position within said predetermined auxiliary sequence.

2. A buffer store as claimed in claim 1, wherein said read control circuitry is configured to select a plurality of main values to be read together from said main store.

3. A buffer store as claimed in claim 1, wherein said main values are one of program instructions and micro-operation instructions.

4. A buffer store as claimed in claim 3, wherein said buffer store is a loop buffer store storing one of program instructions and micro-operation instructions within a repeatedly executed loop.

5. A buffer store as claimed in claim 3, wherein said auxiliary values are branch target address values of predicted taken branch instructions stored within said main store circuitry.

6. A buffer store as claimed in claim 1, wherein N is greater than 10*M.

7. A buffer store as claimed in claim 1, wherein said read control circuitry is configured to detect from said main value read from said main store circuitry that said main value is associated with said auxiliary value and to trigger said auxiliary value to be read from said auxiliary store circuitry.

8. A buffer store comprising:
main store means for storing N main values to be read in a predetermined main sequence;
auxiliary store means for storing M auxiliary values, M being less than N and each auxiliary value of said M auxiliary values being associated with a main value of said N main values; and
read control means for controlling reading from said main store means and from said auxiliary store means such that said auxiliary value is read from said auxiliary store in association with said main value, wherein
said read control means is for controlling reading of auxiliary values from said auxiliary store circuitry in a predetermined auxiliary sequence matched to said predetermined main sequence such that each of said M auxiliary values is read from said auxiliary store means together with an association one of said N main values read from said main store means; and
said read control means comprises shifting control queue means for storing pointers indexing storage locations within said auxiliary store means, said pointers having a relative ordering amongst each other within said shifting control queue means that matches said predetermined auxiliary sequence and said relative ordering within said shifting control queue means being changed upon a read of one or more auxiliary values from said auxiliary store means to represent a next read position within said predetermined auxiliary sequence.

9. A method of buffering comprising the steps of:
storing within a main store N main values to be read in a predetermined main sequence;
storing within an auxiliary store M auxiliary values, M being less than N and each auxiliary value of said M auxiliary values being associated with a main value of said N main values; controlling reading from said main store and from said auxiliary store such that said auxiliary value is read from said auxiliary store in association with said main value; and
controlling reading of auxiliary values from said auxiliary store in a predetermined auxiliary sequence matched to said predetermined main sequence such that each of said M auxiliary values is read from said auxiliary store together with an association one of said N main values read from said main store; and
storing pointers indexing storage locations within said auxiliary store, said pointers having a relative ordering amongst each other within a shifting control queue that matches said predetermined auxiliary sequence and said relative ordering within said shifting control queue being changed upon a read of one or more auxiliary values from said auxiliary store to represent a next read position within said predetermined auxiliary sequence.

10. A method as claimed in claim 9, comprising selecting a plurality of main values to be read together from said main store.

11. A method as claimed in claim 9, wherein said main values are one of program instructions and micro-operation instructions.

12. A method as claimed in claim 11, wherein said main store and said auxiliary store comprise a loop buffer store storing one of program instructions and micro-operation instructions within a repeatedly executed loop.

13. A method as claimed in claim 11, wherein said auxiliary values are branch target address values of predicted taken branch instructions stored within said main store.

14. A method as claimed in claim 9, wherein N is greater than 10*M.

15. A method as claimed in claim 9, further comprising:
detecting from said main value read from said main store that said main value is associated with said auxiliary value, and
triggering said auxiliary value to be read from said auxiliary store.

* * * * *